(12) United States Patent
Amano et al.

(10) Patent No.: US 10,688,865 B2
(45) Date of Patent: Jun. 23, 2020

(54) FUEL TANK

(71) Applicant: TOYOTA JIDOSHA KABUSHIKI KAISHA, Toyota-shi, Aichi-ken (JP)

(72) Inventors: Shinsuke Amano, Okazaki (JP); Yuuki Nagase, Toyota (JP); Toshiaki Asahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 16/050,737

(22) Filed: Jul. 31, 2018

(65) Prior Publication Data

US 2019/0092163 A1 Mar. 28, 2019

(30) Foreign Application Priority Data

Sep. 25, 2017 (JP) ................. 2017-183993

(51) Int. Cl.
*B60K 15/07* (2006.01)
*B60K 15/03* (2006.01)
*B60K 15/073* (2006.01)
*B60K 15/063* (2006.01)

(52) U.S. Cl.
CPC ........ *B60K 15/07* (2013.01); *B60K 15/03177* (2013.01); *B60K 15/073* (2013.01); *B60K 15/03* (2013.01); *B60K 2015/0325* (2013.01); *B60K 2015/0346* (2013.01); *B60K 2015/03118* (2013.01); *B60K 2015/03138* (2013.01); *B60K 2015/03217* (2013.01); *B60K 2015/03223* (2013.01); *B60K 2015/0633* (2013.01)

(58) Field of Classification Search
CPC .............. B60K 15/07; B60K 15/03177; B60K 15/073; B60K 15/03; B60K 2015/03118; B60K 2015/03138; B60K 2015/03217; B60K 2015/03223; B60K 2015/0325; B60K 2015/0346; B60K 2015/0633
See application file for complete search history.

(56) References Cited

U.S. PATENT DOCUMENTS

| 6,138,859 A | 10/2000 | Aulph et al. |
| 10,468,645 B2 * | 11/2019 | Jackson ............ H01M 10/6556 |
| 2006/0102634 A1 | 5/2006 | Potter et al. |
| 2007/0216186 A1 * | 9/2007 | Sumida ................ B60R 13/011 296/64 |
| 2012/0138606 A1 | 6/2012 | Varga |

(Continued)

FOREIGN PATENT DOCUMENTS

| CN | 204249813 U | 4/2015 |
| DE | 10 2012 009 157 A1 | 11/2013 |

(Continued)

*Primary Examiner* — Jacob D Knutson
*Assistant Examiner* — Marlon A Arce
(74) *Attorney, Agent, or Firm* — Oliff PLC

(57) ABSTRACT

A fuel tank includes a fuel tank main body portion, a first supporting pillar portion, and a second supporting pillar portion. The first supporting pillar portion is provided at a vehicle rear side of an inner side of the fuel tank main body portion. The second supporting pillar portion is provided at a vehicle front side of the first supporting pillar portion at the inner side of the fuel tank main body portion and is longer in the vehicle vertical direction than the first supporting pillar portion is in the vehicle vertical direction.

4 Claims, 3 Drawing Sheets

(56) References Cited

U.S. PATENT DOCUMENTS

| | | | |
|---|---|---|---|
| 2013/0174804 A1 | 7/2013 | Matsuda | |
| 2014/0014663 A1 | 1/2014 | Eulitz et al. | |
| 2014/0110038 A1 | 4/2014 | Criel et al. | |
| 2014/0158696 A1* | 6/2014 | Criel | B60K 15/03177 220/562 |
| 2017/0113542 A1* | 4/2017 | Muramatsu | B60K 15/067 |
| 2018/0194219 A1* | 7/2018 | Amano | B60K 15/03177 |
| 2019/0193557 A1* | 6/2019 | Mori | E02F 9/0883 |
| 2019/0225112 A1* | 7/2019 | Zenner | B60K 6/28 |
| 2019/0299824 A1* | 10/2019 | Ito | B60N 2/3075 |

FOREIGN PATENT DOCUMENTS

| | | |
|---|---|---|
| JP | 2007-237776 A | 9/2007 |
| JP | 2013-139234 A | 7/2013 |
| JP | 2014-516327 A | 7/2014 |
| JP | 2014-141246 A | 8/2014 |
| JP | 2015-504386 A | 2/2015 |
| JP | 2016-043565 A | 4/2016 |
| WO | 2014/053285 A1 | 4/2014 |
| WO | 2014/131685 A2 | 9/2014 |
| WO | 2014/131686 A2 | 9/2014 |
| WO | 2015/032924 A1 | 3/2015 |

* cited by examiner

FUEL TANK

CROSS-REFERENCE TO RELATED APPLICATION

This application is based on and claims priority under 35 USC 119 from Japanese Patent Application No. 2017-183993 filed on Sep. 25, 2017, the disclosure of which is incorporated by reference herein.

BACKGROUND

Technical Field

The present disclosure relates to a fuel tank.

Related Art

Japanese Patent Application Laid-Open (JP-A) No. 2016-43565 discloses a method of mounting a built-in part of a blow-molded part. In this method of mounting a built-in part of a blow-molded part, at the time of blow-molding a fuel tank main body portion, a built-in part holding member that is pillar-shaped is disposed at the interior of parisons, and a built-in part of the fuel tank is held by this built-in part holding member.

Further, at the time of molding the fuel tank main body portion, the built-in part holding member is in a state of spanning between one parison and the other parison. Therefore, at the time of molding the fuel tank, the relative positional relationship between the portion that corresponds to the upper wall portion of the fuel tank main body portion, and the portion that corresponds to the lower wall portion of the fuel tank main body portion, can be maintained.

However, in the mounting method that is disclosed in JP-A No. 2016-43565, the built-in part holding member is removed from the fuel tank main body portion after the molding. Therefore, there is room for improvement from the standpoints of maintaining the relative positional relationship between the upper wall portion and the lower wall portion of the fuel tank main body portion that is in a state of being mounted to the vehicle, and maintaining the shape of the fuel tank main body portion in a stable state.

By the way, it has been thought to make the position of the roof portion of a vehicle low for the purpose of improving the external appearance of the vehicle or the like. In this case, it is necessary to change the shape of the floor panel of the vehicle, and further, to also make the shape of the fuel tank main body, which is disposed at the vehicle lower side of the floor panel, correspond to the shape of the floor panel.

SUMMARY

In view of the above-described circumstances, the present disclosure provides a fuel tank in which the shape of a fuel tank main body portion can be made to correspond to the shape of the floor panel of a vehicle at which the position of the roof portion is set to be low, and in which the shape of the fuel tank main body portion, which is in a state of being mounted to the vehicle, can be maintained in a stable state.

A fuel tank relating to a first aspect is mounted to a vehicle lower side of a floor panel that includes a first panel portion that extends in a vehicle transverse direction and a vehicle longitudinal direction as seen from a vehicle vertical direction and on which feet of a passenger can be placed, a second panel portion that extends toward a vehicle upper side from a vehicle rear side peripheral edge portion of the first panel portion, and a third panel portion that extends in the vehicle transverse direction and the vehicle longitudinal direction as seen from the vehicle vertical direction, that extends toward a vehicle rear and lower side from a vehicle upper side peripheral edge portion of the second panel portion, and that supports a seat cushion, and the fuel tank includes: a fuel tank main body portion that is made of resin, that includes an upper wall portion that structures a vehicle upper side portion and a lower wall portion that structures a vehicle lower side portion, that is disposed at a position that overlaps with a portion of the second panel portion as seen from the vehicle longitudinal direction and at a position that overlaps with a portion of the third panel portion as seen from the vehicle vertical direction, and that is configured to be able to store fuel that is to be supplied to a power unit that is mounted in the vehicle; a first supporting pillar portion that is made of resin, that is provided at a vehicle rear side of an inner side of the fuel tank main body portion, that includes one end portion welded to the upper wall portion and another end portion welded to the lower wall portion, and that connects the upper wall portion and the lower wall portion in the vehicle vertical direction; and a second supporting pillar portion that is made of resin, that is provided at a vehicle front side of the first supporting pillar portion at the inner side of the fuel tank main body portion, that includes one end portion welded to the upper wall portion and another end portion welded to the lower wall portion, that connects the upper wall portion and the lower wall portion in the vehicle vertical direction, and that is longer in the vehicle vertical direction than the first supporting pillar portion is in the vehicle vertical direction.

In accordance with the first aspect, the fuel tank is mounted to the vehicle lower side of the floor panel. The fuel tank includes a fuel tank main body portion that is made of resin and that is configured to store fuel that is to be supplied to a power unit that is mounted in the vehicle. This fuel tank main body portion includes an upper wall portion that structures the vehicle upper side portion thereof, and a lower wall portion that structures the vehicle lower side portion thereof. Further, a first supporting pillar portion and a second supporting pillar portion that are respectively made of resin are provided at the inner side of the fuel tank main body portion. Respective one end portions of the first supporting pillar portion and the second supporting pillar portion are welded to the upper wall portion of the fuel tank main body portion, and the other end portions thereof are welded to the lower wall portion of the fuel tank main body portion. The upper wall portion and the lower wall portion are connected in the vehicle vertical direction by the first supporting pillar portion and the second supporting pillar portion. Therefore, in the present disclosure, relative displacement of the upper wall portion and the lower wall portion of the fuel tank main body portion can be suppressed, and, accordingly, changes in the shape of the fuel tank main body portion, which is in a state of being mounted to the vehicle, can be suppressed.

On the other hand, the floor panel has a first panel portion, a second panel portion and a third panel portion. The first panel portion extends in the vehicle transverse direction and the vehicle longitudinal direction as seen from the vehicle vertical direction. In a state in which a passenger is seated on the seat cushion, the feet of the passenger can be placed on the first panel portion. Further, the second panel portion extends toward the vehicle upper side from the peripheral edge portion that is at the vehicle rear side of the first panel portion. The third panel portion extends toward the vehicle rear and lower side from the peripheral edge portion that is at the vehicle upper side of the second panel portion. There is a state in which a step is formed at the floor panel.

Moreover, the third panel portion extends in the vehicle transverse direction and the vehicle longitudinal direction as seen from the vehicle vertical direction, and the seat cushion is supported at the third panel portion. Namely, the seat cushion is in a state of being disposed on the step portion that is provided at the floor panel. Further, due to the seat cushion being supported by the third panel portion, the height of the seating surface of the seat cushion can be set so as to become lower toward the vehicle rear side. Therefore, the buttocks and the femoral region of the passenger who is seated on the seat cushion can be supported in a stable state, and the angle, which is formed by the femoral region and the lower leg region of the passenger, can be kept small. Accordingly, even if the position of the roof portion of the vehicle is set to be low, at the floor panel that is structured as described above, the passenger can sit on the seat cushion in a comfortable posture.

By the way, if the floor panel is structured as described above, a space is formed at the vehicle rear side of the second panel portion and the vehicle lower side of the third panel portion. It can be thought to place the fuel tank main body portion in this space in order to efficiently utilize the space, but, in order to do so, the shape of the fuel tank main body portion must be made to correspond to the shape of the floor panel.

Here, in the present disclosure, the first supporting pillar portion is provided at the vehicle rear side of the inner side of the fuel tank main body portion, and the second supporting pillar portion is provided at the vehicle front side of the first supporting pillar portion. Further, the second supporting pillar portion in the vehicle vertical direction is longer than the first supporting pillar portion is in the vehicle vertical direction. Therefore, in the present disclosure, the vehicle rear side portion of the upper wall portion of the fuel tank main body portion is disposed at a position that is lower than the vehicle front side portion of the upper wall portion, and the shape of the upper wall portion can be made to correspond to the shape of the third panel portion that extends from the peripheral edge portion that is at the vehicle upper side of the second panel portion toward the vehicle rear and lower side.

In a fuel tank relating to a second aspect, in the first aspect, the first supporting pillar portion includes a first main body portion that is shaped as a cylindrical tube and that extends in the vehicle vertical direction, the second supporting pillar portion includes a second main body portion that is shaped as a cylindrical tube and that extends in the vehicle vertical direction, an outer diameter of a cross-section of the second main body portion as seen from the vehicle vertical direction is greater than or equal to an outer diameter of a cross-section of the first main body portion as seen from the vehicle vertical direction, and a sectional surface area of the cross-section of the second main body portion as seen from the vehicle vertical direction is greater than or equal to a sectional surface area of the cross-section of the first main body portion as seen from the vehicle vertical direction.

In accordance with the second aspect, the first supporting pillar portion includes the first main body portion that is shaped as a cylindrical tube and that extends in the vehicle vertical direction. The second supporting pillar portion includes the second main body portion that is shaped as a cylindrical tube and that extends in the vehicle vertical direction.

By the way, in the present disclosure, as described above, the second supporting pillar portion in the vehicle vertical direction is longer than the first supporting pillar portion is in the vehicle vertical direction. Therefore, if the upper wall portion and the lower wall portion of the fuel tank main body portion start to move relatively in a direction orthogonal to the vehicle vertical direction, a bending moment, which is larger than the bending moment that arises at the first main body portion, arises at the second main body portion. Further, because the draft that is needed at the time of molding the second main body portion is greater than the draft that is needed at the time of molding the first main body portion, the wall thickness of the second main body portion must be sufficiently ensured.

Here, in the present disclosure, the outer diameter of the cross-section of the second main body portion as seen from the vehicle vertical direction is greater than or equal to the outer diameter of the cross-section of the first main body portion as seen from the vehicle vertical direction. Further, the sectional surface area of the cross-section of the second main body portion as seen from the vehicle vertical direction is greater than or equal to the sectional surface area of the cross-section of the first main body portion as seen from the vehicle vertical direction. Therefore, the rigidity of the second main body portion, with respect to the bending moment that arises when the upper wall portion and the lower wall portion of the fuel tank main body portion start to move relatively in a direction orthogonal to the vehicle vertical direction, can be made to be higher than that rigidity of the first main body portion. Further, the wall thickness of the second main body portion can be ensured, and the draft that is needed at the time of molding the second main body portion can be ensured.

In a fuel tank relating to a third aspect, in the first aspect, the fuel tank main body portion includes, as seen in a vehicle front view, a first fuel chamber portion at a vehicle transverse direction one side, a second fuel chamber portion at a vehicle transverse direction another side, and a communicating portion that communicates the first fuel chamber portion with the second fuel chamber portion and at which an interval between the upper wall portion and the lower wall portion is narrowed due to at least the lower wall portion bulging-out toward a vehicle upper side, and the first supporting pillar portion and the second supporting pillar portion are provided at at least one of the first fuel chamber portion or the second fuel chamber portion.

In accordance with the third aspect, the fuel tank main body portion is formed to be a so-called saddle type in which a concave portion is provided at the vehicle transverse direction central portion thereof. Therefore, a propeller shaft and the like can be disposed in this concave portion. Further, in such a case as well, at at least one of the first fuel chamber portion or the second fuel chamber portion, relative displacement of the upper wall portion and the lower wall portion of the fuel tank main body portion can be suppressed, and accordingly, changes in the shape of the fuel tank main body portion, which is in a state of being mounted to the vehicle, can be suppressed. Moreover, in such a case as well, at at least one of the first fuel chamber portion or the second fuel chamber portion, the vehicle rear side portion at the upper wall portion of the fuel tank main body portion can be disposed at a position that is lower than the vehicle front side portion of the upper wall portion, and the shape of the upper wall portion can be made to correspond to the shape of the third panel portion that extends toward the vehicle rear and lower side from the peripheral edge portion that is at the vehicle upper side of the second panel portion.

In a fuel tank relating to a fourth aspect, in the first aspect, second supporting pillar portions are disposed at vehicle transverse direction both sides of a vehicle transverse direction center of the fuel tank main body portion, respectively, a first bracket is mounted to one of the second supporting pillar portions, and a first fuel gauge is mounted to the first bracket, a second bracket is mounted to another of the second supporting pillar portions, and a second fuel gauge is mounted to the second bracket, and a fuel suction port through which the fuel can be sucked is provided at at least one of the first bracket or the second bracket.

In accordance with the fourth aspect, as compared with a case in which the first bracket and the second bracket are mounted to the first supporting pillar portions, room for adjusting the respective mounted positions of the first bracket and the second bracket that are mounted to the second supporting pillar portions is ensured, and accordingly, adjustment of the positions of the first fuel gauge and the second fuel gauge and the suction port portion can be made to be easy.

As described above, the fuel tank relating to the first aspect has the excellent effect that the shape of the fuel tank main body portion can be made to correspond to the shape of the floor panel of a vehicle at which the position of the roof portion is set to be low, and the shape of the fuel tank main body portion, which is in a state of being mounted to the vehicle, can be maintained in a stable state.

The fuel tank relating to the second aspect has the excellent effect of being able to make manufacturing of the fuel tank efficient while improving the rigidity of the fuel tank main body portion with respect to external force that is applied in a direction orthogonal to the vehicle vertical direction.

The fuel tank relating to the third aspect has the excellent effect that, even in a case in which the fuel tank main body portion is formed to be a so-called saddle type in which a concave portion is provided at the vehicle transverse direction central portion thereof, the shape of the fuel tank main body portion can be made to correspond to the shape of the floor panel of a vehicle at which the position of the roof portion is set to be low, and the shape of the fuel tank main body portion, which is in a state of being mounted to the vehicle, can be maintained in a stable state.

The fuel tank relating to the fourth aspect has the excellent effect that, while the ease of assembling the respective members that structure the fuel tank is improved, the shape of the fuel tank main body portion can be made to correspond to the shape of the floor panel of a vehicle at which the position of the roof portion is set to be low, and the shape of the fuel tank main body portion, which is in a state of being mounted to the vehicle, can be maintained in a stable state.

BRIEF DESCRIPTION OF THE DRAWINGS

Exemplary embodiments will be described in detail based on the following figures, wherein.

DETAILED DESCRIPTION

An example of an embodiment of a fuel tank is described hereinafter by using FIG. 1 through FIG. 3. Note that arrow FR that is shown appropriately in the respective drawings indicates the vehicle front side, arrow UP indicates the vehicle upper side, and arrow LH indicates the vehicle transverse direction left side.

Figure 2:
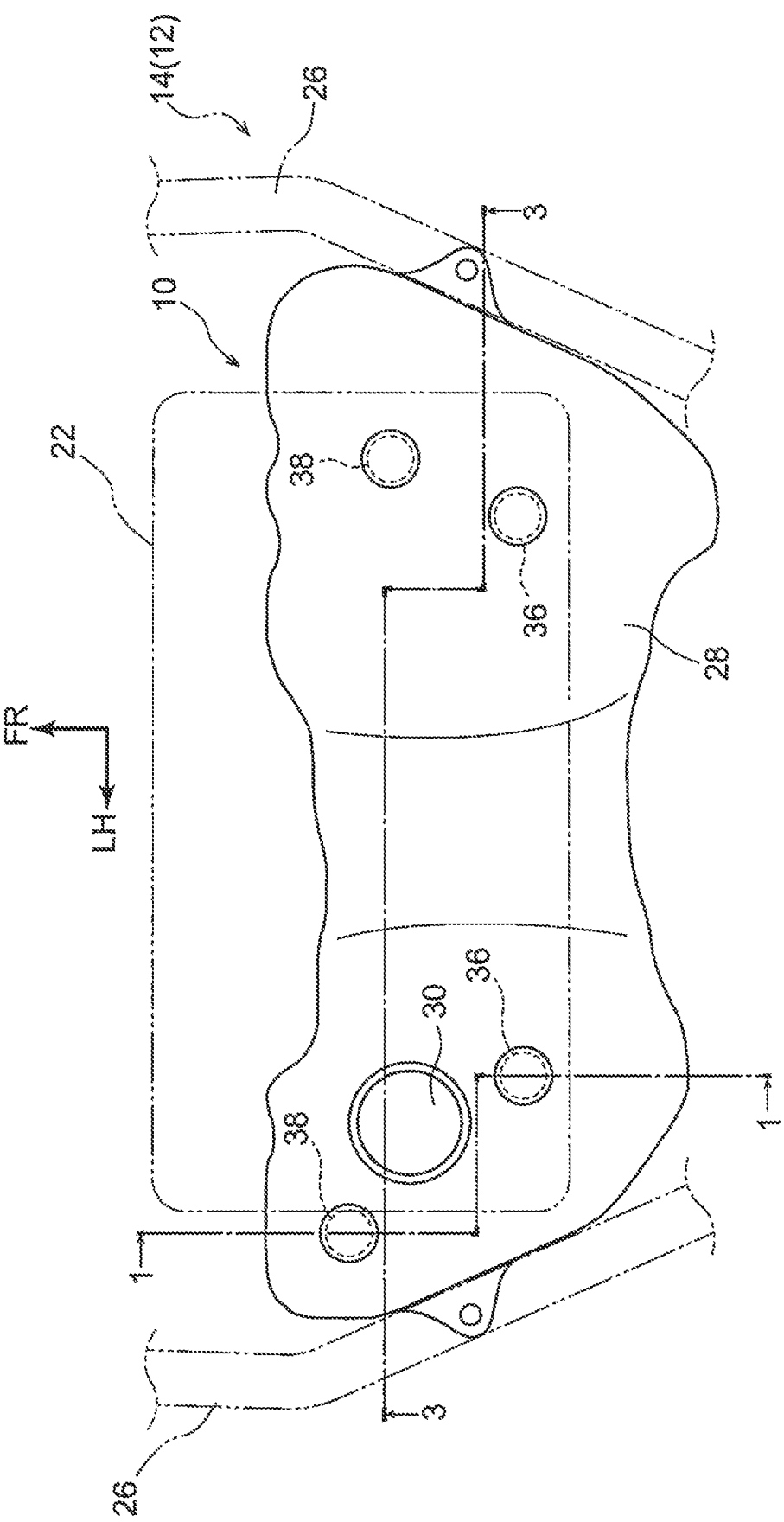
FIG. 2 is a plan sectional view schematically showing the structure of the fuel tank relating to the disclosure.
Figure 3:
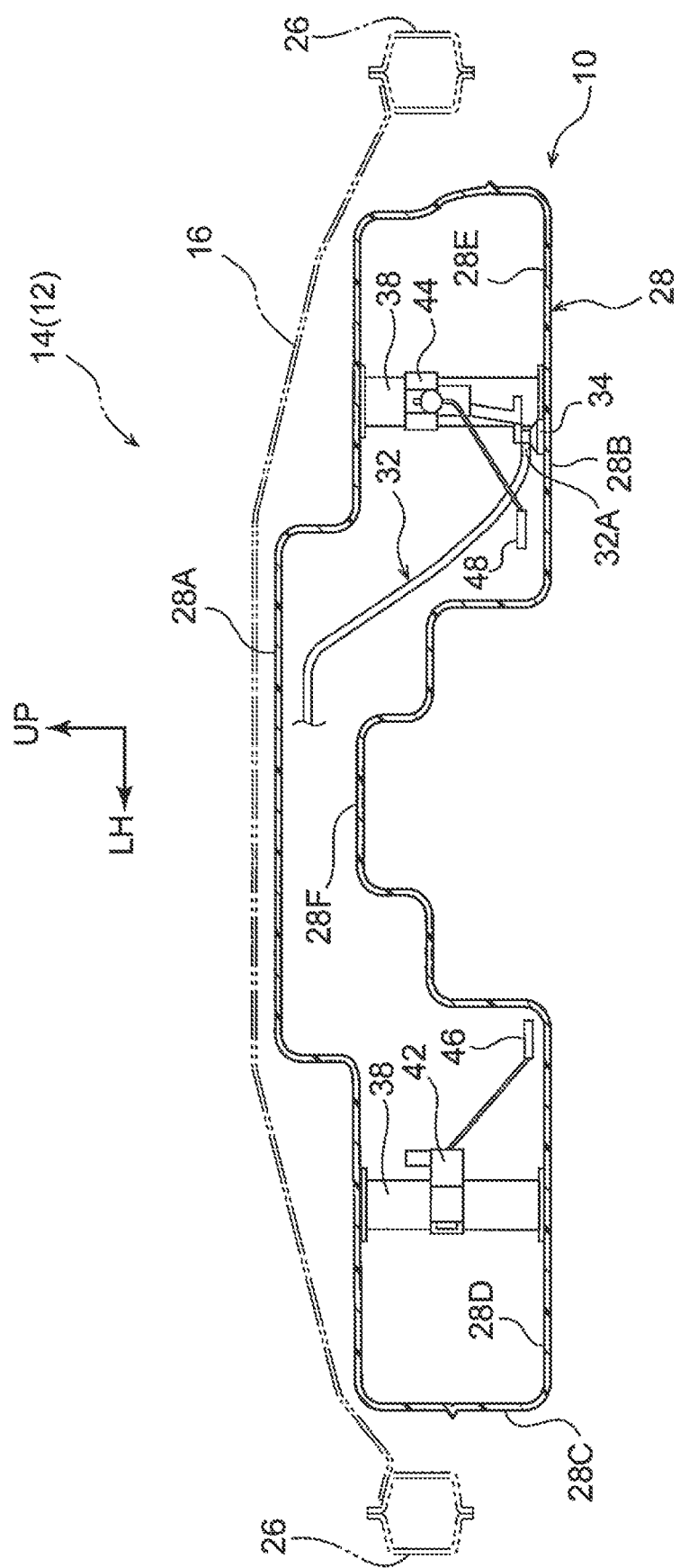
FIG. 3 is a cross-sectional view that is seen from a vehicle rear side and schematically shows the structure of the fuel tank relating to the disclosure (a cross-sectional view showing the state cut along line 3-3 of FIG. 1).

First, the structure of a vehicle body 14 of a vehicle 12, to which a fuel tank 10 relating to the present disclosure is mounted, is described by using FIG. 2 and FIG. 3. Note that, in the present disclosure, because the vehicle body 14 and the fuel tank 10 are structures that basically have left-right symmetry, in the following description, the structures of the vehicle transverse direction left side portions of the vehicle body 14 and the fuel tank 10 are mainly described, and the structures of the vehicle transverse direction right side portions are omitted as appropriate.

The vehicle body 14 has a floor panel 16 that structures a portion of the floor portion of the vehicle body 14. This floor panel 16 is formed by press working a steel plate, and extends in the vehicle longitudinal direction and the vehicle transverse direction as seen as seen from the vehicle vertical direction.

Figure 1:
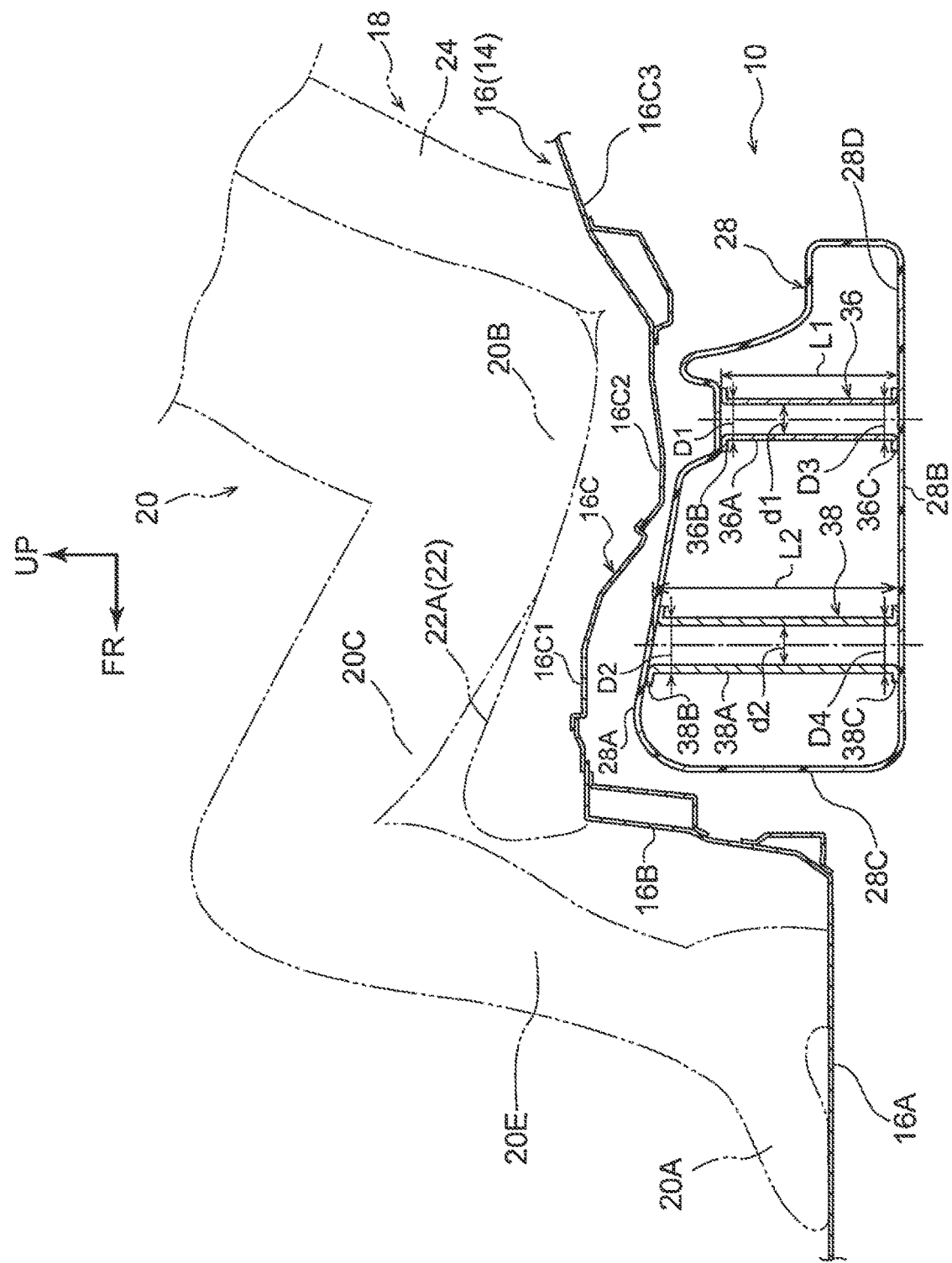
FIG. 1 is an enlarged cross-sectional view that is seen from a vehicle transverse direction outer side and schematically shows the structure of a fuel tank relating to the present disclosure (a cross-sectional view showing the state cut along line 1-1 of FIG. 2)

In detail, as shown in FIG. 1 as well, the floor panel 16 has a first panel portion 16A, a second panel portion 16B, and a third panel portion 16C that are disposed in that order from the vehicle front side. The first panel portion 16A extends in the vehicle transverse direction and the vehicle longitudinal direction as seen from the vehicle vertical direction, and feet 20A of a passenger 20 who is seated in a rear seat 18 can be placed on the first panel portion 16A. Note that the rear seat 18 is structured to include a seat cushion 22 that supports buttocks 20B and a femoral region 20C of the passenger 20, a seatback 24 that supports a back portion 20D of the passenger 20, and a headrest that supports an unillustrated head portion of the passenger 20.

The second panel portion 16B extends toward the vehicle upper side from the peripheral edge portion that is at the vehicle rear side of the first panel portion 16A, with the plate thickness direction of the second panel portion 16B being the vehicle longitudinal direction. As seen from the vehicle longitudinal direction, the second panel portion 16B extends in the vehicle transverse direction. Further, the third panel portion 16C extends toward the vehicle rear side from the peripheral edge portion that is at the vehicle upper side of the second panel portion 16B.

The third panel portion 16C extends in the vehicle transverse direction and the vehicle longitudinal direction as seen from the vehicle vertical direction. A front portion 16C1 thereof, i.e., the portion that overlaps the femoral region 20C of the passenger 20 as seen from the vehicle vertical direction, extends toward a vehicle rear and lower side from the peripheral edge portion that is at the vehicle upper side of the second panel portion 16B. Further, a central portion 16C2 of the third panel portion 16C, i.e., the portion that overlaps the buttocks 20B of the passenger 20 as seen from the vehicle vertical direction, extends rectilinearly from the front portion 16C1 toward the vehicle rear side as seen from the vehicle transverse direction. A rear portion 16C3 of the third panel portion 16C, i.e., the portion that is further toward the vehicle rear side than the buttocks 20B of the passenger 20 as seen from the vehicle vertical direction, extends toward the vehicle rear and upper side from the central portion 16C2.

The seat cushion 22 is disposed at the vehicle upper side of the third panel portion 16C that is structured as described above. This seat cushion 22 is supported by the front portion 16C1 and the central portion 16C2 of the third panel portion 16C. Further, due to the seat cushion 22 being supported by the third panel portion 16C, a seating surface 22A of the seat cushion 22 is in a state of being inclined such that the vehicle vertical direction height thereof becomes lower from the vehicle front side toward the vehicle rear side.

Returning to FIG. 3, a pair of left and right rear side members 26 that are made of steel are disposed at the vehicle lower side of the floor panel 16, along the peripheral edge portions that are at the vehicle transverse direction outer sides of the floor panel 16. These rear side members 26 are closed cross-sectional structures whose cross-sections, as seen from the vehicle longitudinal direction, are substantially rectangular. The rear side members 26 are joined to the floor panel 16 at unillustrated joined portions that are formed by welding or the like.

On the other hand, the fuel tank 10 has a "fuel tank main body portion 28" that structures the main portion thereof. The fuel tank 10 is disposed at the vehicle lower side of the floor panel 16. More concretely, as shown in FIG. 2 as well, as seen from the vehicle vertical direction, the fuel tank main body portion 28 is disposed at a position that overlaps the seat cushion 22, and the main portion of the fuel tank main body portion 28 is accommodated between the rear side members 26.

As shown in FIG. 3, the fuel tank main body portion 28 is structured, of a high-density polyethylene resin, so as to include an upper wall portion 28A that structures the vehicle upper side portion thereof, a lower wall portion 28B that structures the vehicle lower side portion thereof, and a peripheral wall portion 28C that structures the outer peripheral portion thereof and connects the upper wall portion 28A and the lower wall portion 28B.

As shown in FIG. 2, the upper wall portion 28A and the lower wall portion 28B respectively are shaped as plates that are substantially trapezoidal and whose widths decrease toward the vehicle rear side as seen from the vehicle vertical direction. The vehicle transverse direction central portions of the upper wall portion 28A and the lower wall portion 28B bulge-out toward the vehicle upper side. Namely, the fuel tank main body portion 28 is formed to be a so-called saddle type that has, at the vehicle lower side portion of the vehicle transverse direction central portion thereof, a concave portion for the placement of a propeller shaft and the like.

A closed space is formed at the inner side of the fuel tank main body portion 28 that is structured as described above. Fuel, such as gasoline or the like that is to be supplied to an unillustrated power unit such as an engine or the like that is mounted in the vehicle 12, can be stored in the fuel tank main body portion 28. Note that, in the following description, the portion that is at the vehicle transverse direction left side (one side) of the fuel tank main body portion 28 is called a first fuel chamber portion 28D, and the portion that is at the vehicle transverse direction right side (other side) of the fuel tank main body portion 28 is called a second fuel chamber portion 28E. The portion, which communicates the first fuel chamber portion 28D and the second fuel chamber portion 28E and at which the interval between the upper wall portion 28A and the lower wall portion 28B is narrowed, is called a communicating portion 28F.

An unillustrated fuel pump module is disposed at the inner side of the first fuel chamber portion 28D of the fuel tank main body portion 28. This fuel pump module is structured to include a sub-cup, a fuel pump, and a jet pump. The sub-cup can store some fuel, and can be inserted into the inner side of the fuel tank main body portion 28 from an unillustrated pass-through portion that is formed in the upper wall portion 28A of the fuel tank main body portion 28. Note that the pass-through portion into which the sub-cup is inserted is closed, from the outer side of the fuel tank main body portion 28, by a cap member 30 that is disc-shaped (see FIG. 2). Further, the fuel pump and the jet pump are disposed at the inner side of the sub-cup. A flow-in opening portion is provided at the sub-cup, and the sub-cup communicates with the fuel tank main body portion 28 via this flow-in opening portion.

A fuel suction port, through which fuel can be sucked, is provided at the vehicle lower side portion of the fuel pump. Fuel that is within the sub-cup can be sucked from the fuel suction port due to the fuel pump being driven. Further, the fuel that is sucked by the fuel pump is fed-out from the interior of the sub-cup via an unillustrated fuel feed pipe toward the power unit.

On the other hand, the jet pump is connected to the second fuel chamber portion 28E via a fuel transfer pipe 32. In further detail, one end portion 32A of the fuel transfer pipe 32 is connected to a suction port portion 34 that is provided at a bracket 44, which is described later and is disposed at the second fuel chamber portion 28E side. Note that the suction port portion 34 is disposed adjacent to the lower wall portion 28B of the fuel tank main body portion 28. On the other hand, the unillustrated other end portion of the fuel transfer pipe 32 is connected to the jet pump.

Further, some of the fuel that is fed-out by the fuel pump is introduced into the jet pump. Fuel that is within the second fuel chamber portion 28E is sucked by utilizing the negative pressure that arises at the interior of the jet pump due to this fuel being introduced-in. Further, the fuel, which is sucked from the second fuel chamber portion 28E by the jet pump, is fed into the sub-cup via a transfer pipe.

Here, as shown in FIG. 1 and FIG. 2, the present disclosure has the feature that "supporting pillar portions 36" that serve as first supporting pillar portions and "supporting pillar portions 38" that serve as second supporting pillar portions are provided at the inner side of the fuel tank main body portion 28. The structures of the supporting pillar portions 36, 38 that structure main portions of the present disclosure are described in detail hereinafter.

One of each of the supporting pillar portions 36, 38 is provided in the first fuel chamber portion 28D and the second fuel chamber portion 28E. Note that the supporting pillar portions 36, 38 are disposed symmetrically with respect to a central line that extends in the vehicle longitudinal direction of the fuel tank main body portion 28. Hereinafter, description is given of the structures of the supporting pillar portions 36, 38 that are disposed in the first fuel chamber portion 28D.

The supporting pillar portion 36 is disposed at the vehicle rear inner side portion of the first fuel chamber portion 28D. This supporting pillar portion 36 is structured to include a main body portion 36A that serves as a first main body portion and structures the main portion of the supporting pillar portion 36, an upper side flange portion 36B, and a lower side flange portion 36C. The supporting pillar portion 36 is formed of the same material as the fuel tank main body portion 28, i.e., a high-density polyethylene resin.

The main body portion 36A is formed in the shape of a cylindrical tube that extends in the vehicle vertical direction, and more concretely, is the shape of a tube in which a truncated cone, whose diameter increases slightly from the vehicle upper side toward the vehicle lower side, is carved-out in a solid cylindrical shape along the axis thereof. Further, the upper side flange portion 36B is provided at the vehicle upper side end portion of the main body portion 36A, and the lower side flange portion 36C is provided at the vehicle lower side end portion of the main body portion 36A. Namely, the upper side flange portion 36B can be considered to be one end portion of the supporting pillar portion 36, and the lower side flange portion 36C can be considered to be the other end portion of the supporting pillar portion 36.

The upper side flange portion 36B and the lower side flange portion 36C are formed integrally with the main body portion 36A, and are shaped as discs whose central portions are cut-out in circular forms as seen from the vehicle upper side. Further, the supporting pillar portion 36 connects the upper wall portion 28A and the lower wall portion 28B in the vehicle vertical direction due to the upper side flange portion 36B being welded to the upper wall portion 28A of the fuel tank main body portion 28 and the lower side flange portion 36C being welded to the lower wall portion 28B of the fuel tank main body portion 28.

The supporting pillar portion 38 is structured to include a main body portion 38A that serves as a second main body portion, an upper side flange portion 38B, and a lower side flange portion 38C, and is basically structured similarly to the supporting pillar portion 36, and is disposed at a position that is at the vehicle front and outer side with respect to the supporting pillar portion 36. Note that, in the same way as at the supporting pillar portion 36, at the supporting pillar portion 38 as well, the upper side flange portion 38B can be considered to be one end portion of the supporting pillar portion 38, and the lower side flange portion 38C can be considered to be the other end portion of the supporting pillar portion 38. Further, the supporting pillar portion 38 connects the upper wall portion 28A and the lower wall portion 28B in the vehicle vertical direction due to the upper side flange portion 38B being welded to the upper wall portion 28A of the fuel tank main body portion 28 and the lower side flange portion 38C being welded to the lower wall portion 28B of the fuel tank main body portion 28.

The respective joined surfaces of the upper side flange portions 36B, 38B and the lower side flange portions 36C, 38C are joined to the inner surface of the fuel tank main body portion 28 in states of planarly-contacting the inner surface. Note that, in accordance with the structure of the fuel tank main body portion 28, any of various angles can be used as the angles of inclination, with respect to the axis of the main body portion 36A, of the joined surfaces of the upper side flange portion 36B and the lower side flange portion 36C. Further, in accordance with the structure of the fuel tank main body portion 28, any of various angles also can be used as the angles of inclination, with respect to the axis of the main body portion 38A, of the joined surfaces of the upper side flange portion 38B and the lower side flange portion 38C.

Further, in the present disclosure, length L2 of the supporting pillar portion 38 in the vehicle vertical direction is set to be long as compared with length L1 of the supporting pillar portion 36 in the vehicle vertical direction. Note that length L1 means the distance from the point of intersection of the joined surface of the upper side flange portion 36B and the axis of the main body portion 36A, to the point of intersection the joined surface of the lower side flange portion 36C and this axis. On the other hand, length L2 means the distance from the point of intersection of the joined surface of the upper side flange portion 38B and the axis of the main body portion 38A, to the point of intersection of the joined surface of the lower side flange portion 38C and this axis.

Further, although outer diameter D1 of the vehicle upper side end portion of the main body portion 36A is configured to be the same dimension as outer diameter D2 of the vehicle upper side end portion of the main body portion 38A, outer diameter D3 of the vehicle lower side end portion of the main body portion 36A is configured to be a dimension that is smaller than outer diameter D4 of the vehicle lower side end portion of the main body portion 38A. Namely, the average outer diameter of the cross-section of the main body portion 38A as seen from the vehicle vertical direction is configured to be a dimension that is greater than or equal to the average outer diameter of the cross-section of the main body portion 36A as seen from the vehicle vertical direction. Note that the outer diameter D2 may be configured to be a dimension that is greater than the outer diameter D3, and the outer diameter of an arbitrary cross-section of the main body portion 38A as seen from the vehicle vertical direction may be larger than the outer diameter of an arbitrary cross-section of the main body portion 36A as seen from the vehicle vertical direction.

Moreover, inner diameter d1 of the main body portion 36A and inner diameter d2 of the main body portion 38A are set to be the same dimension. Therefore, the sectional surface area of the cross-section of the main body portion 38A as seen from the vehicle vertical direction is configured to be a size that is greater than or equal to the sectional surface area of the cross-section of the main body portion 36A as seen from the vehicle vertical direction. Note that, in FIG. 1, the thickness of the main body portion 38A is illustrated in an exaggerated manner.

Further, as shown in FIG. 3, a bracket 42 that is a body separate from the supporting pillar portion 38 is mounted to the supporting pillar portion 38 that is disposed in the first fuel chamber portion 28D. The bracket 44 that is a body separate from the supporting pillar portion 38 is mounted to the supporting pillar portion 38 that is disposed in the second fuel chamber portion 28E. Note that the brackets 42, 44 are structured of a high-density polyethylene resin. Further, a fuel gauge 46 is mounted to the bracket 42. A fuel gauge 48 and the above-described suction port portion 34 are mounted to the bracket 44.

In the present embodiment, as shown in FIG. 1, the fuel tank 10 is mounted at the vehicle lower side of the floor panel 16. The fuel tank 10 has the fuel tank main body portion 28 that is made of resin and that can store fuel that is to be supplied to the power unit that is mounted to the vehicle 12. This fuel tank main body portion 28 is structured to include the upper wall portion 28A that structures the vehicle upper side portion thereof, and the lower wall portion 28B that structures the vehicle lower side portion thereof. Further, the supporting pillar portions 36 and the supporting pillar portions 38 that are respectively made of resin are provided at the inner side of the fuel tank main body portion 28. Respective one end portions of the supporting pillar portions 36 and the supporting pillar portions 38 are welded to the upper wall portion 28A of the fuel tank main body portion 28, and the respective other end portions thereof are welded to the lower wall portion 28B of the fuel tank main body portion 28. The upper wall portion 28A and the lower wall portion 28B are connected in the vehicle vertical direction by the supporting pillar portions 36 and the supporting pillar portions 38. Therefore, in the present disclosure, relative displacement of the upper wall portion 28A and the lower wall portion 28B of the fuel tank main body portion 28 can be suppressed, and accordingly, changes in the shape of the fuel tank main body portion 28, which is in the state of being mounted in the vehicle 12, can be suppressed.

On the other hand, the floor panel 16 has the first panel portion 16A, the second panel portion 16B and the third panel portion 16C. The first panel portion 16A extends in the vehicle transverse direction and the vehicle longitudinal direction as seen from the vehicle vertical direction. In the state in which the passenger 20 is seated on the seat cushion 22, the feet 20A of the passenger 20 are placed on the first panel portion 16A. Further, the second panel portion 16B extends toward the vehicle upper side from the peripheral edge portion that is at the vehicle rear side of the first panel portion 16A. The third panel portion 16C extends toward the vehicle rear and lower side from the peripheral edge portion that is at the vehicle upper side of the second panel portion 16B. There is a state in which a step is formed at the floor panel 16.

Moreover, the third panel portion 16C extends in the vehicle transverse direction and the vehicle longitudinal direction as seen from the vehicle vertical direction, and the seat cushion 22 is supported by this third panel portion 16C. Namely, the seat cushion 22 is in a state of being disposed on the step portion that is provided at the floor panel 16. Further, due to the seat cushion 22 being supported at the third panel portion 16C, the height of the seating surface 22A of the seat cushion 22 can be set so as to become lower toward the vehicle rear side. Therefore, the buttocks 20B and the femoral region 20C of the passenger 20 who is seated on the seat cushion 22 can be supported in a stable state, and the angle, which is formed by the femoral region 20C and a lower leg region 20E of the passenger 20, can be kept small. Accordingly, even if the position of the roof portion (not shown) of the vehicle 12 is set to be low, at the floor panel 16 that is structured as described above, the passenger 20 can sit on the seat cushion 22 in a comfortable posture.

By the way, if the floor panel 16 is structured as described above, a space is formed at the vehicle rear side of the second panel portion 16B and the vehicle lower side of the third panel portion 16C. It can be thought to place the fuel tank main body portion 28 in this space in order to efficiently utilize the space, but, in order to do so, the shape of the fuel tank main body portion 28 must be made to correspond to the shape of the floor panel 16.

Here, in the present disclosure, the supporting pillar portions 36 are provided at the vehicle rear side of the inner side of the fuel tank main body portion 28, and the supporting pillar portions 38 are provided at the vehicle front sides of the supporting pillar portions 36. Further, length L2 of the supporting pillar portions 38 in the vehicle vertical direction is set to be longer than length L1 of the supporting pillar portions 36 in the vehicle vertical direction. Therefore, in the present disclosure, the vehicle rear side portion of the upper wall portion 28A of the fuel tank main body portion 28 is disposed at a position that is lower than the vehicle front side portion of the upper wall portion 28A, and the shape of the upper wall portion 28A can be made to correspond to the shape of the third panel portion 16C that extends from the peripheral edge portion at the vehicle upper side of the second panel portion 16B toward the vehicle rear and lower side. Accordingly, in the present disclosure, it is possible to make the shape of the fuel tank main body portion 28 correspond to the shape of the floor panel 16 of the vehicle 12 at which the position of the roof portion is set to be low, and the shape of the fuel tank main body portion 28, which is in a state of being mounted to the vehicle 12, can be maintained in a stable state.

Moreover, by setting the length L1 of the supporting pillar portions 36 and the length L2 of the supporting pillar portions 38 as described above, as compared with a case in which the brackets 42, 44 are mounted to the supporting pillar portions 36, room for adjusting the mounted positions of the brackets 42, 44 that are mounted to the supporting pillar portions 38 is ensured, and accordingly, adjustment of the positions of the fuel gauges 46, 48 and the suction port portion 34 can be made to be easy.

Further, in the present disclosure, the supporting pillar portion 36 is structured so as to include the main body portion 36A that is shaped as a cylindrical tube that extends in the vehicle vertical direction. The supporting pillar portion 38 is structured so as to include the main body portion 38A that is shaped as a cylindrical tube that extends in the vehicle vertical direction.

By the way, in the present disclosure, as described above, the length L2 of the supporting pillar portions 38 in the vehicle vertical direction is set to be longer than the length L1 of the supporting pillar portions 36 in the vehicle vertical direction. Therefore, if the upper wall portion 28A and the lower wall portion 28B of the fuel tank main body portion 28 start to move relatively in a direction orthogonal to the vehicle vertical direction, bending moments, which are larger than the bending moments that arise at the main body portions 36A, arise at the main body portions 38A. Further, because the draft that is needed at the time of molding the main body portions 38A is greater than the draft that is needed at the time of molding the main body portions 36A, the wall thickness of the main body portions 38A must be sufficiently ensured.

Here, in the present disclosure, the outer diameter of the cross-section of the main body portion 38A as seen from the vehicle vertical direction is set to a magnitude that is greater than or equal to the outer diameter of the cross-section of the main body portion 36A as seen from the vehicle vertical direction. Further, the sectional surface area of the cross-section of the main body portion 38A as seen from the vehicle vertical direction is set to a magnitude that is greater than or equal to the sectional surface area of the cross-section of the main body portion 36A as seen from the vehicle vertical direction. Therefore, the rigidity of the main body portion 38A, with respect to the bending moment that arises when the upper wall portion 28A and the lower wall portion 28B of the fuel tank main body portion 28 start to move relatively in a direction orthogonal to the vehicle vertical direction, can be made to be higher than that rigidity of the main body portion 36A. Further, the wall thickness of the main body portion 38A can be ensured, and the draft that is needed at the time of molding the main body portion 38A can be ensured. Accordingly, in the present disclosure, manufacturing of the fuel tank 10 can be made to be efficient, while improving the rigidity of the fuel tank main body portion 28 with respect to external force that is applied in a direction orthogonal to the vehicle vertical direction.

In the above-described disclosure, the fuel tank main body portion 28 is made to be a saddle type, but the supporting pillar portions 36, 38 may be provided at a fuel tank main body portion that has a shape other than the form of a saddle.

Further, in the above-described disclosure, the fuel tank main body portion 28 and the supporting pillar portions 36, 38 are formed of a high-density polyethylene resin. However, the fuel tank main body portion 28 and the supporting pillar portions 36, 38 may be formed of another type of resin, in accordance with the specifications of the fuel tank 10.

What is claimed is:

1. A fuel tank that is mounted to a vehicle lower side of a floor panel that includes a first panel portion that extends in a vehicle transverse direction and a vehicle longitudinal direction as seen from a vehicle vertical direction and on which feet of a passenger can be placed, a second panel portion that extends toward a vehicle upper side from a vehicle rear side peripheral edge portion of the first panel portion, and a third panel portion that extends in the vehicle transverse direction and the vehicle longitudinal direction as seen from the vehicle vertical direction, that extends toward a vehicle rear and lower side from a vehicle upper side peripheral edge portion of the second panel portion, and that supports a seat cushion, the fuel tank comprising:

a fuel tank main body portion that is made of resin, that includes an upper wall portion that structures a vehicle upper side portion and a lower wall portion that structures a vehicle lower side portion, that is disposed at a position that overlaps with a portion of the second panel portion as seen from the vehicle longitudinal direction and at a position that overlaps with a portion of the third panel portion as seen from the vehicle vertical direction, and that is configured to be able to store fuel that is to be supplied to a power unit that is mounted in the vehicle;

a first supporting pillar portion that is made of resin, that is provided at a vehicle rear side of an inner side of the fuel tank main body portion, that includes one end portion welded to the upper wall portion and another end portion welded to the lower wall portion, and that connects the upper wall portion and the lower wall portion in the vehicle vertical direction; and a second supporting pillar portion that is made of resin, that is provided at a vehicle front side of the first supporting pillar portion at the inner side of the fuel tank main body portion, that includes one end portion welded to the upper wall portion and another end portion welded to the lower wall portion, that connects the upper wall portion and the lower wall portion in the vehicle vertical direction, and that is longer in the vehicle vertical direction than the first supporting pillar portion is in the vehicle vertical direction.

2. The fuel tank of claim 1, wherein:

the first supporting pillar portion includes a first main body portion that is shaped as a cylindrical tube and that extends in the vehicle vertical direction, the second supporting pillar portion includes a second main body portion that is shaped as a cylindrical tube and that extends in the vehicle vertical direction, an outer diameter of a cross-section of the second main body portion as seen from the vehicle vertical direction is greater than or equal to an outer diameter of a cross-section of the first main body portion as seen from the vehicle vertical direction, and a sectional surface area of the cross-section of the second main body portion as seen from the vehicle vertical direction is greater than or equal to a sectional surface area of the cross-section of the first main body portion as seen from the vehicle vertical direction.

3. The fuel tank of claim 1, wherein:

the fuel tank main body portion includes, as seen in a vehicle front view, a first fuel chamber portion at a vehicle transverse direction one side, a second fuel chamber portion at a vehicle transverse direction another side, and a communicating portion that communicates the first fuel chamber portion with the second fuel chamber portion and at which an interval between the upper wall portion and the lower wall portion is narrowed due to at least the lower wall portion bulging-out toward a vehicle upper side, and the first supporting pillar portion and the second supporting pillar portion are provided at at least one of the first fuel chamber portion or the second fuel chamber portion.

4. The fuel tank of claim 1, wherein:

second supporting pillar portions are disposed at vehicle transverse direction both sides of a vehicle transverse direction center of the fuel tank main body portion, respectively, a first bracket is mounted to one of the second supporting pillar portions, and a first fuel gauge is mounted to the first bracket, a second bracket is mounted to another of the second supporting pillar portions, and a second fuel gauge is mounted to the second bracket, and a fuel suction port through which the fuel can be sucked is provided at at least one of the first bracket or the second bracket.

* * * * *